Patented Apr. 1, 1930

1,752,351

UNITED STATES PATENT OFFICE

HARRY ROTHENBERG, OF WEST NORWOOD, NEW JERSEY, AND SAMUEL L. HENKEN, OF BRONX, NEW YORK, ASSIGNORS TO HENRY HYMAN, OF BROOKLYN, NEW YORK

DRY-CELL-BATTERY SEALING COMPOSITION

No Drawing. Application filed February 17, 1927. Serial No. 169,130.

This invention relates to an improvement in dry cell batteries by which the individual cells are assembled in a container and insulated from each other in such a manner that the danger of short circuits is diminished. In carrying out this invention, the insulating material between the cells is made of sulphur mixed or compounded with other materials in such a manner that added strength is given to the sulphur, and it is made more suitable for performing the desired functions. The insulating material comprising sulphur may surround the cells on all sides, and not only insulate the cells from each other, but also hold the same rigidly in position without danger of the individual cells becoming loosened or displaced from their settings.

We have found that an excellent insulating material for keeping the cells separated can be obtained by mixing sulphur with organic materials that may be termed "fillers." One of the most desirable substances to be mixed with sulphur for this purpose, is rubber. The sulphur may be melted and the rubber introduced. The addition of very small percentages of rubber greatly improve the product. We have found the addition of about one per cent of rubber or less makes a very satisfactory product. The rubber not only improves insulating qualities of the sulphur, but also imparts to the same an increased tensile strength, thus enabling the composition to retain the cells in place and keep them insulated from each other better than the sulphur alone would do. The increased tensile strength of the composition is especially useful in retaining the gases in the cells that are generated when the cells are delivering current at comparatively high rates.

Instead of introducing rubber into the sulphur, other organic materials may be used, such as coal tar dyes and lakes, resins (natural or synthetic), asphalt, pitch, paint pigments, lamp black or gas black and cellulosic materials. Some of these materials are soluble in sulphur, and some of them are fusible at temperatures below the boiling point of sulphur. Lakes of different colors may be added thereby obtaining the desired colors for the final composition.

The composition may be applied by pouring the same in a molten condition into the spaces between and under the cells, after the cells have been placed in position in a container. Or, sheets of fibrous insulating material, such as paper, board, or the like, may be inserted between the cells and the molten composition poured in to imbed and impregnate the sheets of insulating material. Or, the insulating composition may be introduced in a molten condition into a container for a plurality of the cells and the cells may be forced or sunk into place in the material, which is afterwards permitted to harden.

A sufficient amount of the sulphur composition may be introduced to cover the top of the cells. If desired, a layer of the usual sealing compositions may be added at the top, into which the manufacturer's stamp and other insignia may be impressed.

When organic materials that are cheaper than sulphur are introduced, the cost of the composition is thus decreased, and at the same time the organic materials improve the product whether they are dissolved in the sulphur or mechanically suspended therein, especially when they are in a sufficiently finely divided form.

We claim:

A composition for insulating dry cells comprising sulphur and rubber in the proportion of about 99 to 1.

HARRY ROTHENBERG.
SAMUEL L. HENKEN.